United States Patent
Hanaka et al.

(10) Patent No.: US 9,292,018 B2
(45) Date of Patent: Mar. 22, 2016

(54) MOVING BODY SYSTEM AND METHOD FOR CONTROLLING TRAVEL OF MOVING BODY

(75) Inventors: Satoshi Hanaka, Kyoto (JP); Tetsuya Shimizu, Kyoto (JP)

(73) Assignee: MURATA MACHINERY, LTD., Kyoto (JP)

(*) Notice: Subject to any disclaimer, the term of this patent is extended or adjusted under 35 U.S.C. 154(b) by 50 days.

(21) Appl. No.: 14/131,995

(22) PCT Filed: May 8, 2012

(86) PCT No.: PCT/JP2012/061733
§ 371 (c)(1),
(2), (4) Date: Jan. 10, 2014

(87) PCT Pub. No.: WO2013/014990
PCT Pub. Date: Jan. 31, 2013

(65) Prior Publication Data
US 2014/0142792 A1    May 22, 2014

(30) Foreign Application Priority Data
Jul. 22, 2011 (JP) ................. 2011-161282

(51) Int. Cl.
*G05D 1/10* (2006.01)
*G05D 1/02* (2006.01)
*B61L 25/02* (2006.01)
*B65G 54/02* (2006.01)

(52) U.S. Cl.
CPC ............ *G05D 1/0259* (2013.01); *B61L 25/026* (2013.01); *B65G 54/02* (2013.01)

(58) Field of Classification Search
None
See application file for complete search history.

(56) References Cited

U.S. PATENT DOCUMENTS

| | | | |
|---|---|---|---|
| 2006/0016363 A1 | 1/2006 | Nakao et al. | |
| 2008/0123111 A1* | 5/2008 | Hori | B60L 13/03 356/620 |
| 2008/0265826 A1* | 10/2008 | Sasaki | G01D 5/2013 318/687 |
| 2009/0243402 A1* | 10/2009 | O'Day | G01D 5/244 310/12.19 |
| 2010/0236445 A1* | 9/2010 | King | B60L 13/003 104/130.03 |
| 2011/0060490 A1* | 3/2011 | Sato | B60L 15/002 701/22 |
| 2013/0074724 A1* | 3/2013 | King | E01B 25/34 104/130.02 |

FOREIGN PATENT DOCUMENTS

| | | | | |
|---|---|---|---|---|
| JP | 2007-010535 | * | 1/2007 | ............... G01B 7/00 |
| JP | 4148194 B2 | | 9/2008 | |
| JP | 4513673 B2 | | 7/2010 | |

OTHER PUBLICATIONS

Official Communication issued in International Patent Application No. PCT/JP2012/061733, mailed on Jul. 24, 2012.

* cited by examiner

*Primary Examiner* — John R Olszewski
*Assistant Examiner* — Jess Whittington
(74) *Attorney, Agent, or Firm* — Keating & Bennett, LLP

(57) ABSTRACT

A detector detects positions of a moving body in a travel direction at a position shifted from a center of control of travel of the moving body in a direction different than the travel direction of the moving body. Positions of the center of control in the travel direction relative to the output of the detector is stored in a storage unit for at least a curved section of a travel route of the moving body, and the travel of the moving body is controlled by a controller, based on the positions of the center of control read out from the storage unit.

9 Claims, 6 Drawing Sheets

F I G. 1
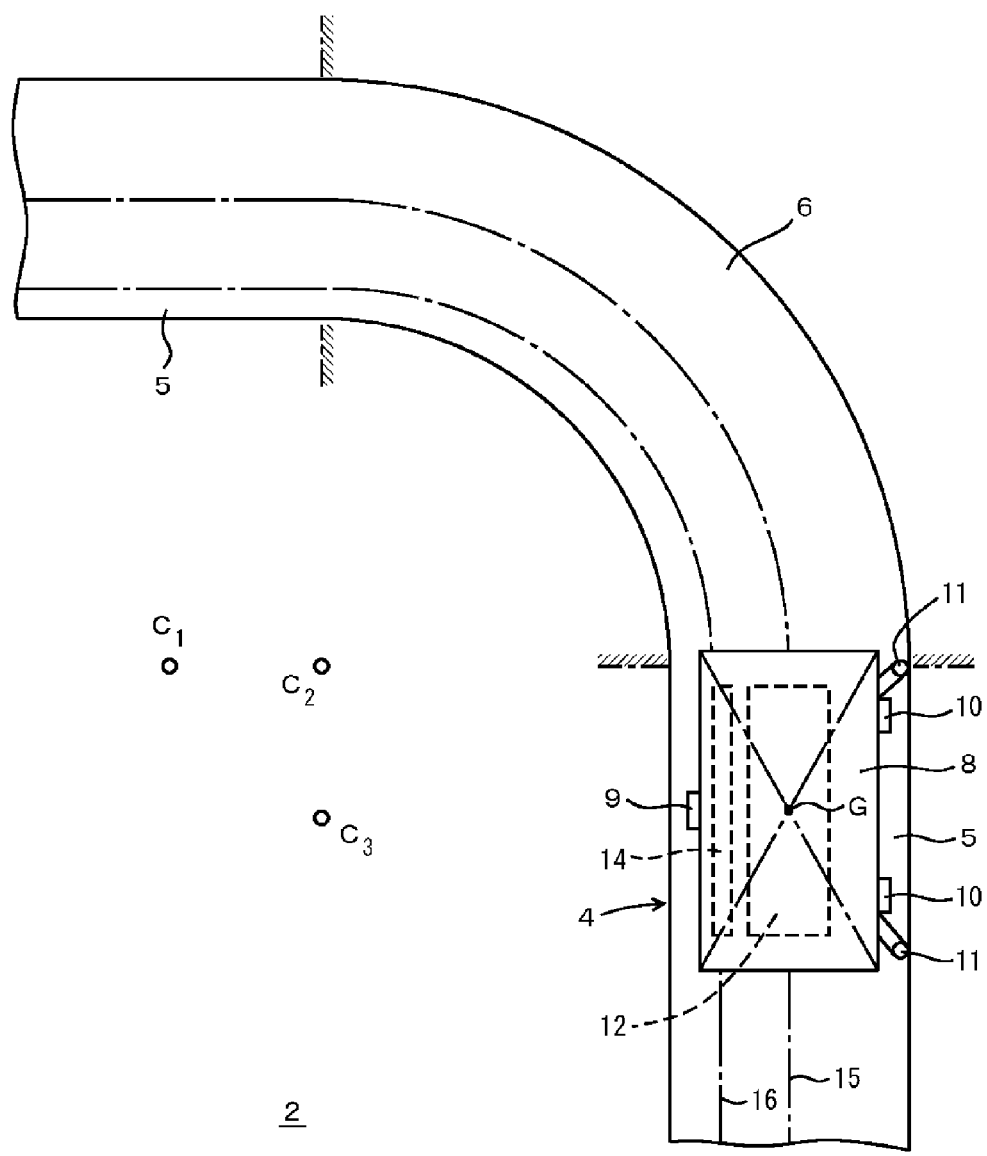

F I G. 4
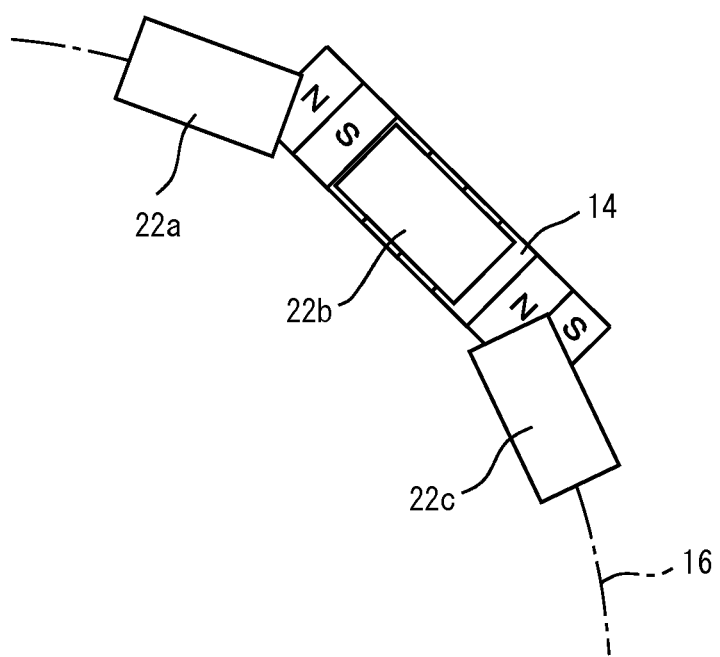

MOVING BODY SYSTEM AND METHOD FOR CONTROLLING TRAVEL OF MOVING BODY

BACKGROUND OF THE INVENTION

1. Field of the Invention

The present invention relates to detecting a position of a moving body and controlling travel.

2. Description of the Related Art

Conventionally known moving body systems include, for example, loaders for transferring articles such as workpieces or tools to and from equipment such as a machine tool, and overhead traveling vehicle systems for transferring articles such workpieces or reticles to and from equipment such as a semiconductor fabrication device. While providing a curved section on the trajectory of a moving body increases the flexibility with which equipment is disposed, feedback control of the travel cannot be carried out if the position of the moving body cannot be accurately measured in the curved section. Also, while it is convenient if the moving body can transfer articles to and from equipment in the curved section, this requires that the position of the moving body in the curved section be accurately measured, and that the moving body be stopped at a predetermined position.

In terms of the related art, JP 4513673B discloses a technique for detecting the position of a moving body in a curved section with linear sensors, and in particular, discloses a technique for shortening the effective range of linear sensors in a curved section. JP 4148194B discloses a technique in which, when a mark provided on the trajectory is read with an optical sensor and the distance that a moving body has traveled is derived, the traveled distance derived by the optical sensor is corrected using a ratio of the radius of curvature of the center of trajectory and the radius of curvature of the position where the mark is provided.

Incidentally, the curved section of the trajectory of a moving body may be other than a quarter circle or the like. When the curved section is configured as a quarter circle, the centrifugal force change suddenly at the entrance and exist of the curved section. In view of this, enlarging the radius of curvature at the entrance and exit of the curved section and reducing the radius of curvature in the middle portion of the curved section enables the change in centrifugal force at the entrance and exit of the curved section to be reduced. Also, although the moving body is guided by guide rollers or the like in the curved section, the moving body is guided less than perfectly at the entrance and exit of the curved section and tends to wobble. For the above reasons, it is difficult to accurately derive the position of a moving body in a curved section simply by correcting the ratio of the radii of curvature.

SUMMARY OF THE INVENTION

Preferred embodiments of the present invention enable a moving body to travel with high precision by accurately deriving the position of the moving body in a curved section.

A moving body system according to a preferred embodiment of the present invention includes a detector configured to detect positions of a moving body in a travel direction of the moving body, at a position shifted from a center of control of travel of the moving body in a different direction to the travel direction, a storage unit configured to store positions of the center of control in the travel direction relative to outputs of the detector, for at least a curved section of a travel route of the moving body, and a control unit configured and programmed to control the travel of the moving body, based on the positions of the center of control read out from the storage unit.

A moving body travel control method according to a preferred embodiment of the present invention includes the steps of detecting positions of a moving body in a travel direction of the moving body with a detector, at a position shifted from a center of control of travel of the moving body in a different direction to the travel direction, reading out the positions of the center of control from a storage unit configured to store positions of the center of control in the travel direction relative to outputs of the detector for at least a curved section of a travel route of the moving body, and a controlling the travel of the moving body, based on the positions of the center of control read out from the storage unit, which steps are repeatedly executed.

Wobbling of the moving body in the curved section makes it difficult to convert positions shifted from the center of control to the positions of the center of control by correcting the ratio of the radii of curvature. Also, when the radius of curvature is made larger at the entrance and exit of the curved section than at other portions, the ratio of the radii of curvature is not constant to begin with. However, in a preferred embodiment of the present invention, a storage unit that stores the positions of the center of control in the travel direction relative to the outputs of the detector for at least the curved section of the travel route of the moving body is provided, and the travel of the moving body is controlled on the basis of the positions of the center of control read out from the storage unit. Accordingly, the detected positions are accurately converted to the position of the center of control, thus enabling the travel to be controlled with high precision even in the curved section. The moving body can also be accurately stopped in the curved section. Note that, herein, description relating to the moving body system also applies directly to the moving body travel control method.

Preferably, a linear motor is provided on the moving body or the travel route of the moving body, the center of control is a reference position that is referenced when controlling the linear motor, and the detector is a magnetic sensor provided laterally to the linear motor provided on the travel route or the moving body, and is disposed so as to detect magnets or magnetic materials provided laterally to the linear motor provided on the moving body or the travel route. It is difficult to dispose a detector so as to detect the vicinity of the center of the moving body, when the moving body is made to travel using a linear motor, because of overlap with the disposition of the linear motor. In view of this, a detector including a magnetic sensor is provided laterally to the linear motor provided on the travel route or the moving body, and magnets or magnetic materials provided laterally to the linear motor provided on the moving body or the travel route is detected, enabling the positions of the moving body to be detected without interference with the linear motor. The detected positions are then converted to the positions of the center of control using data stored in the storage unit.

Particularly preferably, a plurality of the detectors are provided along the travel route, so as to detect magnets or magnetic materials provided on the moving body, a selector configured to extract the output of at least one detector that is detecting the magnets or magnetic materials, from the outputs of the plurality of detectors, and the positions of the center of control of the moving body is read out from the storage unit according to the output of the at least one detector extracted by the selector. Providing a detector on the travel route necessitates a plurality of detectors, because the detection range of each detector is narrower in the curved section. In view of this, if the position is readout from the storage unit after a detector has been selected by a selector, then one storage unit is sufficient.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 schematically shows the trajectory of a moving body in a preferred embodiment of the present invention.

FIG. 4 shows linear sensors and detection magnets.

DETAILED DESCRIPTION OF THE PREFERRED EMBODIMENTS

Figure 2:
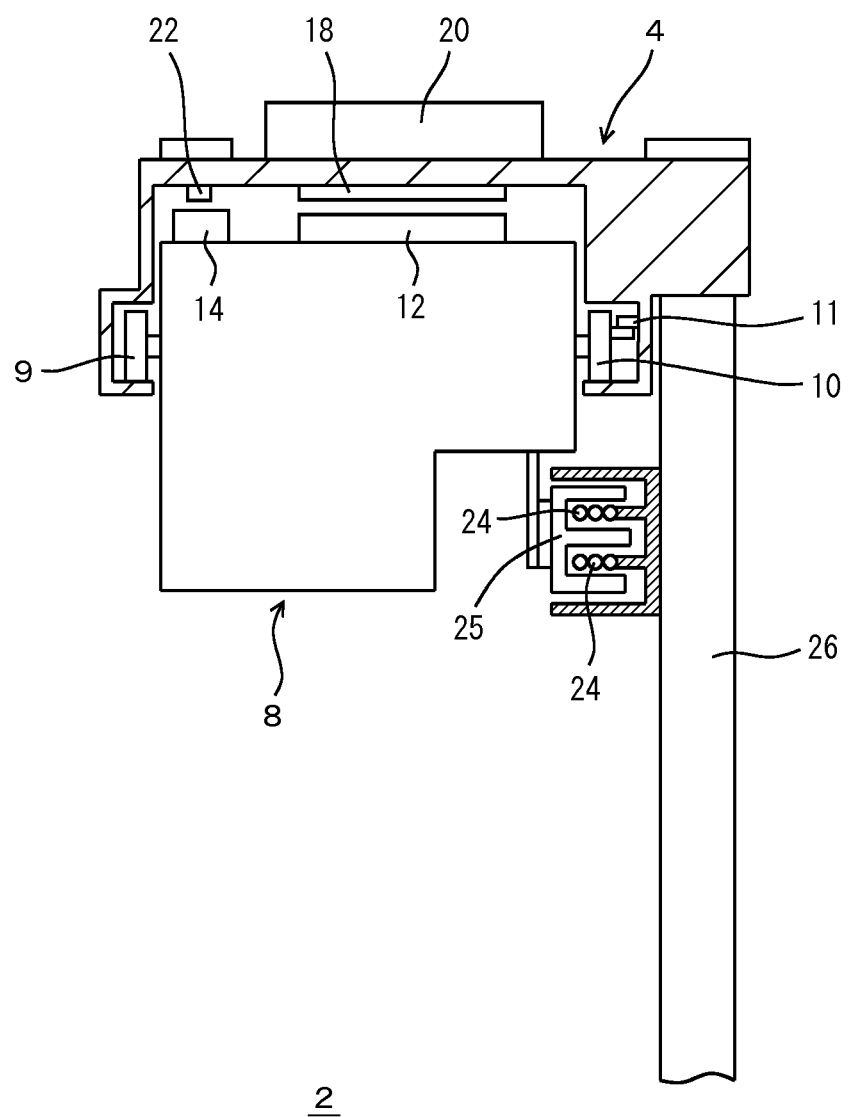
FIG. 2 is a vertical sectional view of the moving body and the trajectory.

The following describes preferred embodiments of the present invention. The scope of the present invention is based on the claims, and is intended to be determined in accordance with the understanding of a person skilled in the art with reference to the description of the present invention and related art in the field of the present invention.

A moving body system 2 of preferred embodiments is shown in FIGS. 1 to 7. In these diagrams, reference numeral 4 denotes the trajectory along which a moving body 8 travels, and includes straight sections 5 and a curved section 6. The moving body 8 travels along the trajectory 4 preferably using three wheels including a wheel 9 and a pair of wheels 10, for example, and is guided by a pair of guide rollers 11 that are guided by the trajectory 4 in the curved section 6. Although the trajectory 4 changes direction by 90 degrees in the curved section 6, the curved section 6 preferably is not a quarter circle, and has a large radius of curvature in the vicinity of the entrance and in the vicinity of the exit and a small radius of curvature in the central portion. Reference numeral C1 denotes the center of curvature in the vicinity of the entrance of the curved section 6, reference numeral C2 denotes the center of curvature in the vicinity of the center, and reference numeral C3 denotes the center of curvature in the vicinity of the exit. Although, in the present preferred embodiment, the trajectory 4 preferably is an L-shaped trajectory in which the straight sections 5 are provided on both sides of the curved section 6, the trajectory is not particularly limited in terms of layout, type and structure. Also, the moving body 8 is not particularly limited in terms of type and structure, and may be, for example, an overhead traveling vehicle that travels around an overhead space of a building, or a guided vehicle that travels along a trajectory provided on the ground.

The moving body 8 is provided with a row 12 of permanent magnets, which are the movable elements of a linear motor. Hereinafter, the row 12 of permanent magnets may be simply referred to as permanent magnets 12. The moving body 8 is preferably provided with a row 14 of magnets to be detected laterally to the permanent magnets 12. Hereinafter, this row 14 may be simply referred to as magnets to be detected 14. Reference numeral G denotes the center of control, being the center of the moving body 8, and is also the center of the permanent magnets 12, The linear motor is controlled on the basis of this position G. Reference numeral 15 is the trajectory of the center of control G, and reference numeral 16 is the trajectory of the magnets to be detected 14, or, more accurately, the trajectory of a central portion of the magnets to be detected 14 in the lengthwise direction.

FIG. 2 shows the trajectory 4 and the moving body 8. Primary coils 18 of a linear synchronous motor apply thrust to the permanent magnets 12 serving as movable elements, and cause the moving body 8 to travel. Note that the type of linear motor is not particularly limited, and may be a linear induction motor or the like. Alternatively, a normal traveling motor may be mounted in the moving body 8 instead of a linear motor. Furthermore, the primary coils 18 of the linear motor may be provided on the moving body 8, and the movable elements may be provided on the trajectory 4. Reference numeral 20 is a coil driver that drives the primary coils 18. Reference numerals 22 are linear sensors provided in the curved section. The linear sensors 22 are exemplary magnetic sensors, and function to detect the row 14 of magnets to be detected. Similar linear sensors 23 are disposed in the straight sections 5 at a greater interval than the linear sensors 22 provided in the curved section. The moving body 8 receives contactless power supply from the trajectory 4, with reference numerals 24 denoting litz wires and reference numeral 25 denoting a power-receiving coil. Reference numeral 26 denotes a support of the trajectory 4. A contact power supply system may be used instead of the contactless power supply, or a lithium ion battery or the like may be mounted to the moving body 8.

Figure 3:
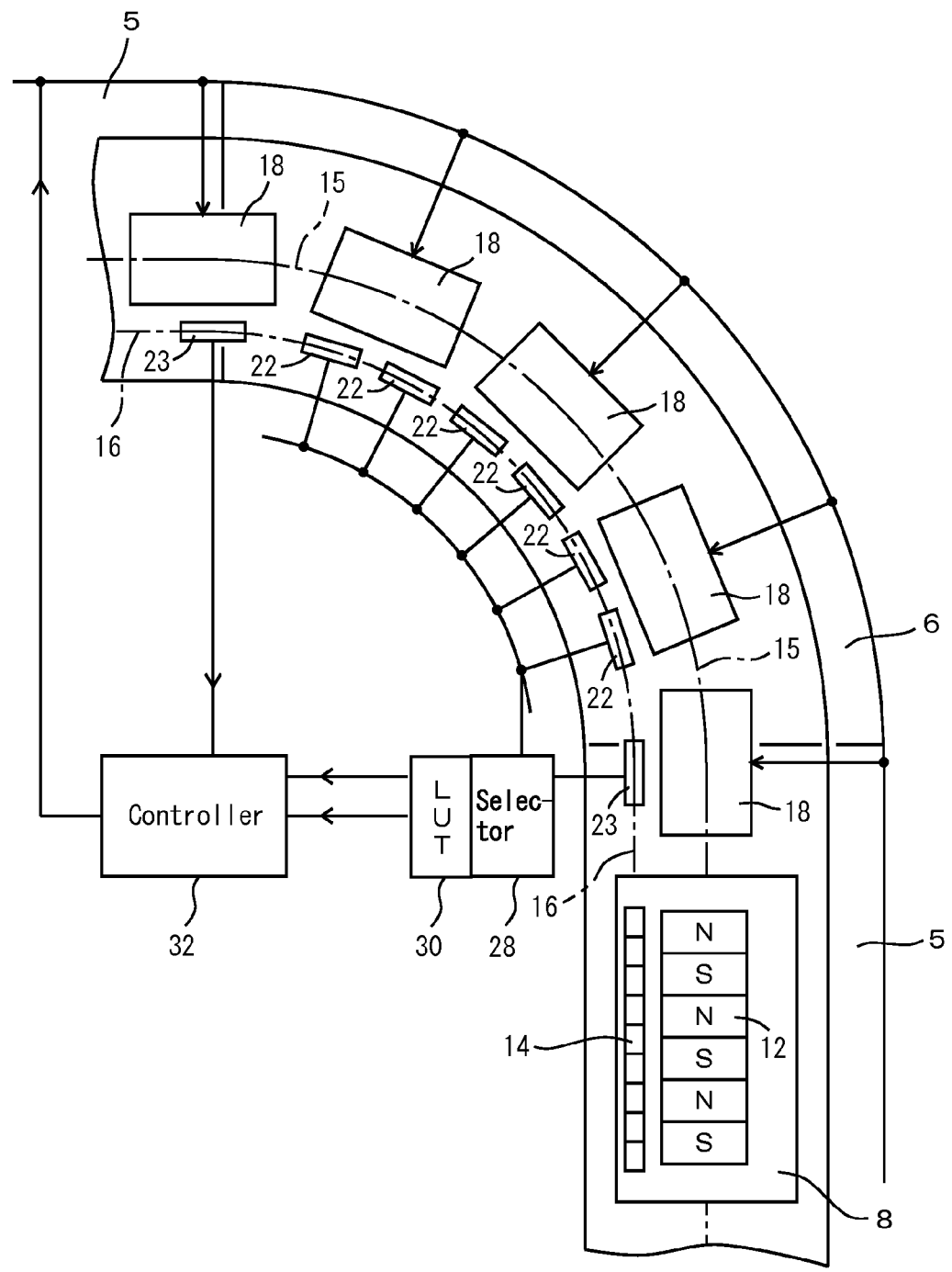
FIG. 3 is a block diagram of a travel drive system of the moving body.

The arrangement of the primary coils 18, the linear sensors 22 and 23 and the like is shown in FIG. 3. The primary coils 18 are disposed along the trajectory 15 of the center of control, and the linear sensors 22 and 23 are disposed along the trajectory 16 of the detection magnets. The outputs of the plurality of linear sensors 22 provided in the curved section is inputted to a selector 28, and the selector 28 reads out the positions of the center of control from a LUT 30 (reference table), using the outputs of the sensor having the highest amplitude. The LUT 30 stores the positions of the center of control in the curved section, and also stores, as headers, which linear sensor 22 in the curved section 6 is being used, the output from the linear sensor that is being used, and the positions of the center of control that was read out is output to a controller 32. Although one LUT 30 is preferably used in the present preferred embodiment, a configuration may be adopted in which separate LUTs are provided for each linear sensor 22, in which case the position of the center of control in the curved section 6 and the amplitude of the output of the sensor are output from each linear sensor 22, and selected with the selector 28. Note that in the case where a pair of adjacent linear sensors 22 and 22 output comparable amplitudes, the position of the center of control may be derived from the output of each of the two sensors and the resultant values may, for example, be averaged, or the position of the center of control may be derived from the output of one of the two sensors.

The linear sensors 23 in the straight sections 5 are disposed at a greater interval than the linear sensors 22, and, for example, output the coordinates of the center of control that are obtained by the linear sensors 23 directly to the controller 32. As a result of the above, the coordinates of the center of control of the moving body 8 are obtained in the straight sections 5 and the curved section 6, and the controller 32 carries out feedback control on the primary coils 18 via the coil driver 20 based on these coordinates.

FIG. 4 shows the arrangement of the linear sensors 22 relative to the row 14 of magnets to be detected. Here, a linear sensor 22b preferably completely overlaps the row 14 of magnets to be detected, and the linear sensors 22a and 22c provided before and after the linear sensor 22b partially overlap. In this case, because the output from the linear sensors 22b has a higher amplitude and greater precision than the output from the linear sensors 22a and 22c, the output of the linear sensor 22b is extracted by the selector.

Figure 5:
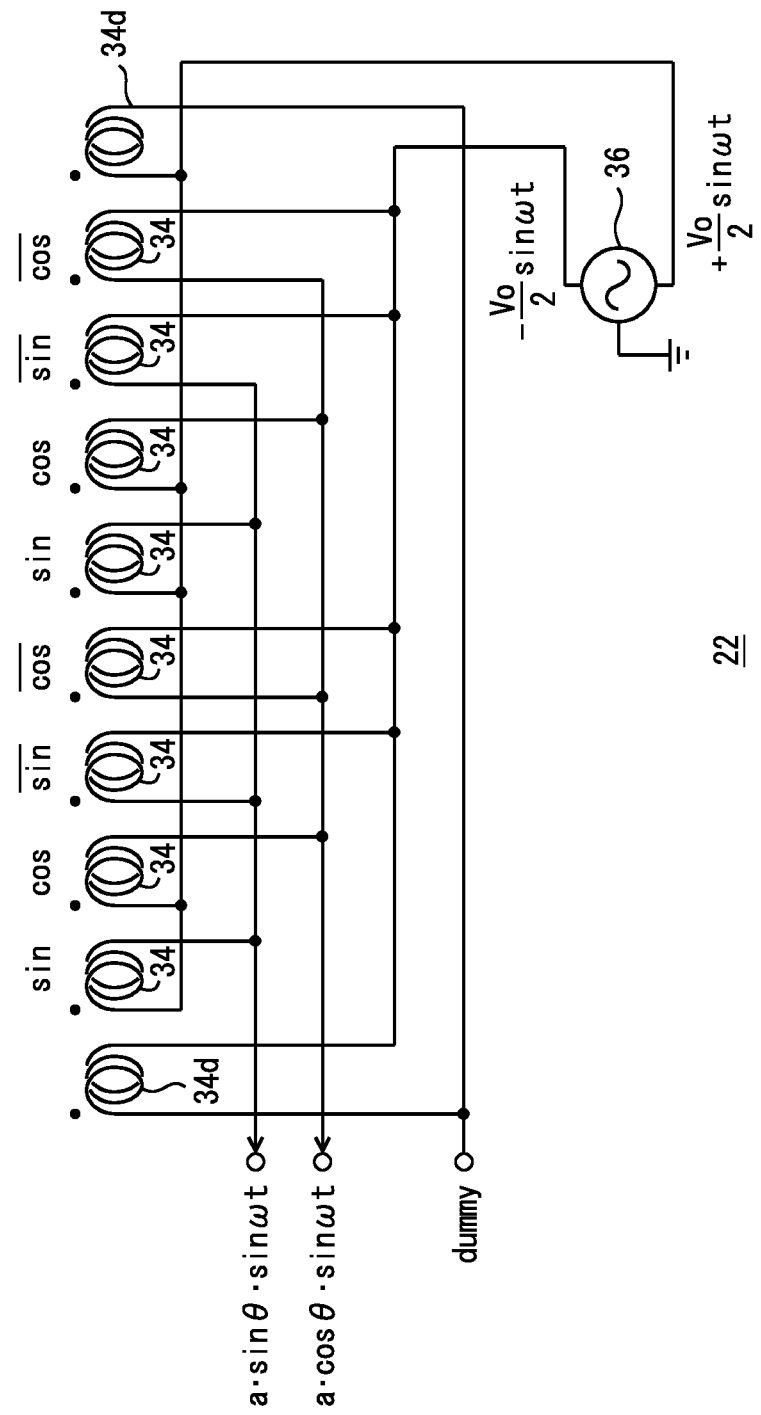
FIG. 5 is a block diagram of a main section of the linear sensors.

FIG. 5 shows the structure of the linear sensors 22. The linear sensors 23 also have a similar structure. For example, 6, 10 or 14 coils 34 are disposed in series, and are driven by a voltage from an AC power supply 36 that uses a DA converter. The output of the AC power supply 36 preferably is about +V0/2·sin ωt on one side and about −V0/2·sin ωt on the other side with respect to ground potential. The phase of the output of a sensor 22 changes by 2π when the linear sensor 22 moves one permanent magnet relative to the row 14 of magnets. When this phase is given by θ, each coil 34 has four types of output, namely, sin θ sin ωt, cos θ sin ωt, −sin θ sin ωt and −cos θ sin ωt, with the type of output being shown above the coil 34. Also, the two coils 34d at either end are dummy coils. Because the eight coils 34 for use in phase detection all thus have another coil on either side, the mutual inductance between the coils is the same, and the impedances of the eight coils 34 for use in phase detection will be equal.

The outputs sin θ sin ωt and cos θ sin ωt are obtained from the circuit shown in FIG. 5, and because the value of ωt is known at the AC power supply 36, sin θ sin ωt is converted to sin θ cos ωt by an auxiliary circuit not shown. Next, sin θ cos ωt and cos θ sin ωt are added to obtain sin(θ+ωt), enabling phase θ to be known from the time at which θ+ωt=nπ (where n is an integer), for example.

Figure 6:
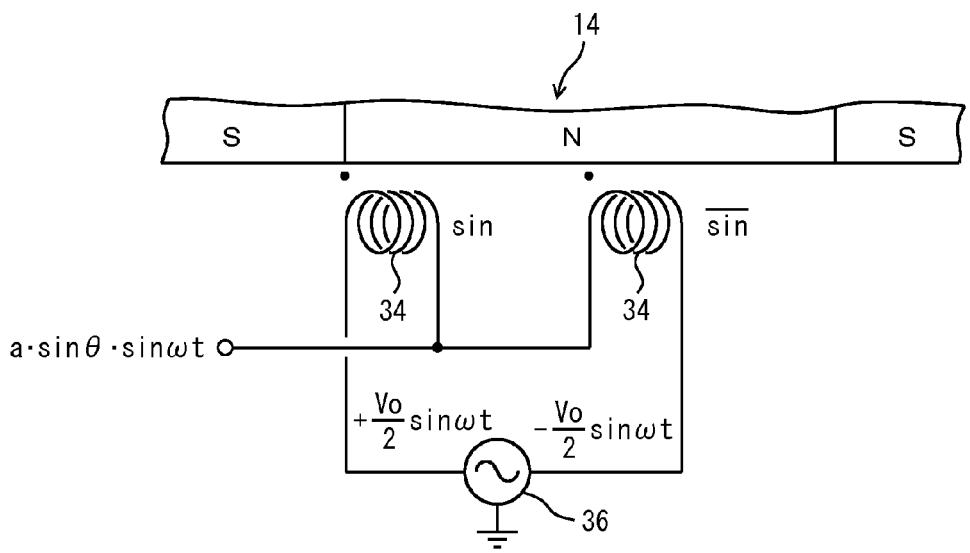
FIG. 6 shows a portion including two coils of a linear sensor.

The mechanism by which a large amplitude output is obtained from the middle linear sensor 22b in the state shown in FIG. 4 will be described with reference to FIG. 6. In the circuit shown in FIG. 5, the coils from which the output sin θ sin ωt is obtained are connected in series with the coils from which the output −sin θ sin ωt is obtained, and the coils from which the output cos θ sin ωt is obtained are connected in series to the coils from which the output −cos θ sin ωt is obtained. FIG. 6 shows the coils 34 when broken down into pairings of two coils. In FIG. 6, output is produced by the difference in the phases of the two coils 34 with respect to the magnets to be detected 14. Here, similar to the sensors 22a and 22c, in the case where the coils overlap only partially with the magnets, coils that do not overlap with the magnets will have a small output, and the linearity of the output will also be low. In view of this, the selector selects the linear sensor having a highest amplitude a of outputs a·sin θ sin ωt and a·cos θ sin ωt, for example.

Figure 7:
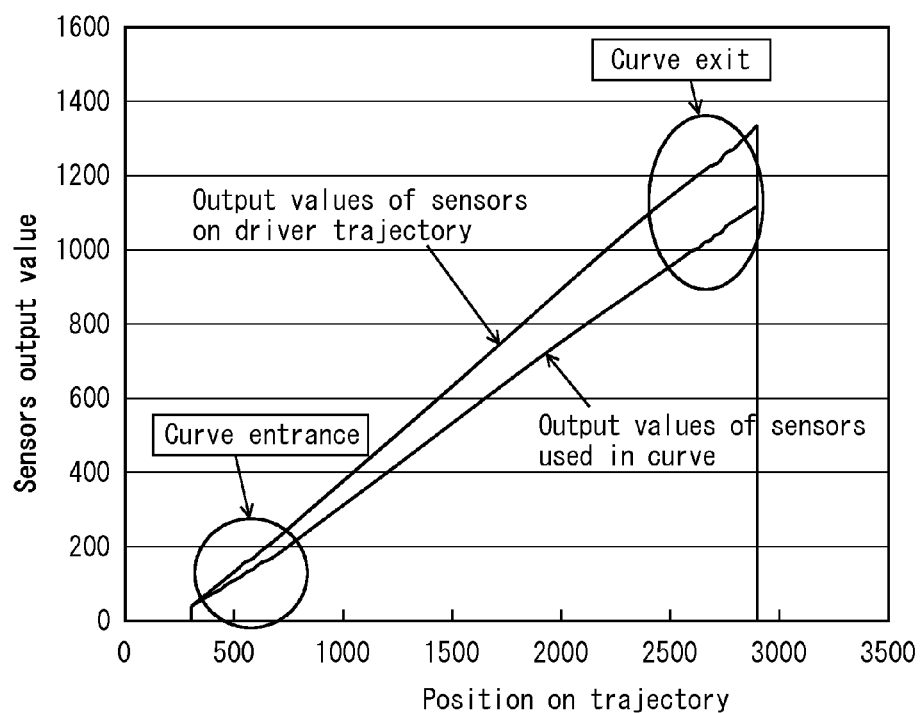
FIG. 7 shows output values of linear sensors used in a curve and output values of other sensors provided on the trajectory of a driver.

The relationship between the output values of linear sensors used in the curve and the output values of sensors on the driver trajectory (trajectory of the center of control) is shown in FIG. 7. It is necessary to derive this relationship beforehand and create a correspondence table, but because it is often difficult to provide linear sensors at the position of the center of control. The positions on the driver trajectory can be estimated from the outputs values of the linear sensors and encoders, or the like that are attached to at least two of the three axles to which the wheels 9 and 10 are attached, and associating the output values of the encoders with the output values of the linear sensors. In this case, the moving body 8 is made to travel at low speed, and the number of rotations of the wheels 9 and 10 is detected by the encoders after having increased the wheel pressure of the wheels 9 and 10 on the trajectory 4 so as to be able to disregard slippage. The position of the center of control is then derived based on the average number of rotations. Apart from this technique, it is possible, for example, to provide optical sensors on both the left and right sides of the row 12 of the permanent magnet shown in FIG. 2, to dispose optical marks on the facing surface of the trajectory 4, and to obtain the position of the center of trajectory by averaging the positions derived by reading the marks.

The output values of the sensors on the driver trajectory of the center of trajectory and the output values of the sensors used in the curve shown in FIG. 7 are not linear, and the slope of the entrance and exit of the curve differs from the slope of the middle portion of the curve. This is because the radius of curvature of the curve is differentiated between the middle portion and the entrance and exit. Wobbling occurs at the entrance and exit of the curve until contact between the guide rollers and the trajectory stabilizes. For this reason, there is a slight instability in all of the sensor output values, and the position of the center of control cannot be derived as a simple function of the output values of the sensors used in the curve. However, there are no restrictions such as functions when a reference table is used, and the position of the center of control is immediately read out from the reference table according to the output of the sensors used in the curve. Also, the position of the center of control is read out with a single LUT 30 for a plurality of linear sensors 22.

The present preferred embodiment obtains at least the following advantageous effects, for example.
(1) The position of the center of control of the moving body 8 is accurately detected even in the curved section, and accurate travel control is performed.
(2) The position of the center of control is derived even when the linear sensors 22 and the row 14 of magnets to be detected are disposed laterally to the linear motor so as to not interfere with the linear motor positioned in a middle portion of the moving body in the width direction.
(3) The optimal linear sensor is selected from the plurality of linear sensors 22, and the position of the center of control is read out from a single LUT 30.
(4) The moving body 8 is thus accurately stopped in a curved section or the like, and the flexibility with which machine tools, load ports and the like are disposed increases.

In the present preferred embodiment, which of the linear sensors 22 to use is determined using the amplitude of the outputs of the linear sensors. Alternatively, since the previous position of the center of control is known at the controller 32, which of the linear sensors 22 to use may be determined based on this position. In the present preferred embodiment, linear sensors that use the coils 34 are illustrated, but other magnetic sensors such as Hall effect sensors may be used instead of the coils 34. Also, a configuration such as a row in which magnetic bodies and the nonmagnetic bodies are arranged alternately may be detected, instead of the row 14 of the magnets to be detected.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A moving body system comprising:
a travel route;
a moving body that travels along the travel route;
a detector including at least one linear sensor that detects and outputs positions of the moving body in a travel direction of the moving body, the at least one linear sensor of the detector being located at a position that is shifted from a center of control of travel of the moving body in a direction different than the travel direction;

a lookup table that stores positions of the center of control in the travel direction corresponding to the positions output by the at least one linear sensor of the detector, for at least a curved section of the travel route of the moving body;

a controller that controls the travel of the moving body, based on the positions of the center of control read out from the lookup table; and a linear motor; wherein a first element of the linear motor is provided in the moving body and a second element of the linear motor is provided along the travel route; and the center of control is a reference position in the travel direction that is referenced to control the travel of the moving body.

2. The moving body system according to claim 1, wherein:

the center of control is referenced when controlling the linear motor; and the at least one linear sensor of the detector is a magnetic sensor provided laterally to the linear motor provided on the travel route or the moving body, and is disposed so as to detect magnets or magnetic materials provided laterally to the linear motor on the moving body or the travel route.

3. The moving body system according to claim 2, wherein a plurality of the detectors are provided along the travel route, so as to detect magnets or magnetic materials provided on the moving body; and the controller is programmed to obtain the position of the center of control from the lookup table, according to an output of at least one detector of the plurality of the detectors.

4. The moving body system according to claim 1, wherein a radius of curvature of the curved section of the travel route is larger at an entrance and an exit of the curved section than at a middle portion of the curved section.

5. The moving body system according to claim 1, wherein, in the curved section of the travel route, the moving body is at least partially guided by guide rollers.

6. The moving body system according to claim 1, wherein:

the lookup table stores pre-calibrated positions of the center of control and corresponding outputs of the at least one linear sensor.

7. The moving body system according to claim 6, wherein the pre-calibrated positions of the center of control are measured with at least an encoder attached to an axis of a wheel of the moving body, in a travel state of the moving body system where slippage between the wheel of the moving body and the travel route is negligible.

8. A moving body travel control method for repeatedly executing the steps of:

causing a moving body to travel by a linear motor;

detecting and outputting positions of a moving body in a travel direction of the moving body with a detector that includes at least one linear sensor, at a position shifted from a center of control of travel of the moving body in a direction different than the travel direction;

reading out the positions of the center of control from a lookup table that stores positions of the center of control in the travel direction corresponding to the positions output by the at least one linear sensor of the detector for at least a curved section of a travel route of the moving body; and controlling the travel of the moving body, based on the positions of the center of control read out from the lookup table; wherein a first element of the linear motor is provided in the moving body and a second element of the linear motor is provided along the travel route; and the center of control is a reference position in the travel direction that is referenced to control the travel of the moving body.

9. The moving body travel control method according to claim 8, further comprising the steps of:

detecting, by a plurality of the detectors provided along the travel route, magnets or magnetic materials provided on the moving body;

extracting an output of at least one of the plurality of detectors that is detecting the magnets or magnetic materials; and reading out, from the lookup table, the position of the center of control according to the extracted output of the at least one of the plurality of detectors.

* * * * *